(12) United States Patent
Ding et al.

(10) Patent No.: US 11,514,708 B2
(45) Date of Patent: Nov. 29, 2022

(54) ANTI-SPOOFING FOR CONTACTLESS FINGERPRINT READERS

(71) Applicant: THALES DIS USA, Inc., Austin, TX (US)

(72) Inventors: Yi Ding, Austin, TX (US); Jinwook Kim, Austin, TX (US); Dimitar Gospodinov, Austin, TX (US)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/190,730

(22) Filed: Mar. 3, 2021

(65) Prior Publication Data

US 2022/0284210 A1 Sep. 8, 2022

(51) Int. Cl.
| | |
|---|---|
| *G06V 40/13* | (2022.01) |
| *G06V 40/40* | (2022.01) |
| *G06V 10/28* | (2022.01) |
| *G06V 40/12* | (2022.01) |
| *G06T 7/529* | (2017.01) |
| *G06N 20/00* | (2019.01) |

(52) U.S. Cl.
CPC ......... *G06V 40/1312* (2022.01); *G06N 20/00* (2019.01); *G06T 7/529* (2017.01); *G06V 10/28* (2022.01); *G06V 40/1388* (2022.01); *G06V 40/40* (2022.01); *G06T 2207/20182* (2013.01)

(58) Field of Classification Search
CPC .... G06V 40/1312; G06V 40/40; G06V 10/28; G06V 40/1388; G06T 2207/20182; G06T 7/529; G60N 20/00
See application file for complete search history.

(56) References Cited

U.S. PATENT DOCUMENTS

| | | | |
|---|---|---|---|
| 9,270,899 B1 * | 2/2016 | Ivanchenko | G06T 7/194 |
| 9,395,562 B1 * | 7/2016 | Nguyen | A61B 3/111 |
| 2009/0245591 A1 * | 10/2009 | Rowe | G06V 10/143 |
| | | | 382/115 |
| 2019/0362130 A1 * | 11/2019 | Othman | G06V 40/11 |

FOREIGN PATENT DOCUMENTS

| | | | | |
|---|---|---|---|---|
| CN | 111222479 A | * | 6/2020 | ......... G06K 9/00268 |
| CN | 212229660 U | * | 12/2020 | ............... G02B 1/11 |

* cited by examiner

*Primary Examiner* — Lixi C Simpson
(74) *Attorney, Agent, or Firm* — The Jansson Firm; Pehr B. Jansson

(57) ABSTRACT

Contactless fingerprint reader. The contactless fingerprint reader has one or more light sources adapted to emit light under different lighting conditions, a first camera adapted to successively capture first images of a subject captured with and without flash light, at least one second camera adapted to capture second images from different angles, one or more sensors adapted to generate one or more spatial-temporal signals representing a change of a distance between said subject and one or more locations of the contactless fingerprint reader, and communication module for sending the first images, said second images, and the one or more spatial-temporal signals to an anti-spoofing device.

12 Claims, 5 Drawing Sheets

ANTI-SPOOFING FOR CONTACTLESS FINGERPRINT READERS

FIELD OF THE INVENTION

The present invention relates to a method and an apparatus of anti-spoofing for contactless fingerprint readers.

BACKGROUND OF THE INVENTION

Contactless fingerprint readers are a new generation of fingerprint capture devices that are emerging in recent years and attracting more and more attentions from the biometric market. Compared with the traditional contact based fingerprint capture devices, this type of devices provide a novel way to capture fingerprint images without requiring any touches between the capture zone and fingers. So that, the contactless fingerprint readers have many advantages over the contact ones, such like higher capture speed, robust to moisture, less maintenance, and etc.

However, due to the capture mechanism of directly taking photos of the fingers/hand, this type of contactless devices could be vulnerable to a few types of the spoofing attacks, for example, presenting a printed fingers/hand to the device, presenting a tablet or phone with fingers/hand displayed on screen, presenting faux fingers/hand, and so on. Without tackling those kind of spoofing attacks, the falsely accepted fingerprints may lead to severe safety risks for the biometric applications or the systems that use the contactless fingerprint readers as the capture devices.

Current fingerprint anti-spoofing approaches are mainly for traditional (i.e., contact-based) live-scan fingerprint readers. There are not satisfactory approaches/technologies for the contactless fingerprint readers.

Therefore, there is a need to provide fast and accurate fingerprint anti-spoofing functions on contactless fingerprint readers.

SUMMARY OF THE INVENTION

The present invention aims at providing a method and apparatus for enhancing the contactless fingerprint devices' anti-spoofing abilities.

The present invention is defined, in its broadest sense, as an anti-spoofing method for a contactless fingerprint reader, the method comprising steps of:
- receiving, from the contactless fingerprint reader, first images of a subject successively captured with and without flash light;
- computing pixel differences between the image captured with flash light and the image captured without flash light to estimate a foreground area in these images as a shape of the subject;
- extracting a feature vector of the shape to classify it into a positive class or a negative class based on machine learning;
- calculating a value representing a texture pattern of an image of the subject captured with flash light and received from the contactless fingerprint reader to classify the value into a positive class or a negative class based on machine learning;
- receiving, from the contactless fingerprint reader, second images of the subject captured from different angles;
- computing from the second images a depth map of the subject to classify the depth map into a positive class or a negative class based on machine learning;
- receiving, from the contactless fingerprint reader, one or more spatial-temporal signals representing a change of a distance between the subject and one or more locations of the contactless fingerprint reader during a predetermined time period;
- extracting feature vectors of the one or more spatial-temporal signals to classify the feature vectors into a positive class or a negative class based on machine learning;
- detecting a spoofing attack if there is at least one negative classification result from the above classifying steps.

This invention thus allows collecting a few types of images and signals, including image with flashing and images without flashing (called first images, or 2D images), stereo images (called second images, or 3D images), and spatial-temporal (or distance-temporal) signals, of the subject (or object, e.g. fingers, palm, hand, fake fingers/hand, etc.) presented to the contactless fingerprint reader. Then, the invention allows analyzing properties of the collected images and sensor data from different aspects. More specifically, the proposed analyzing processes includes 2D shape analysis, 3D shape analysis, texture analysis, and multi-channel signal (e.g., signals generated by multiple sensors) pattern analysis. By analyzing the data properties mentioned above, a conclusion of whether the object presented to the contactless fingerprint reader is real fingers/hand or not can be made quickly and accurately.

With the help of this invention, most of common types of spoofing attacks, including printed fingers/hands on paper or plastic, displayed fingers/hands on screen, and rubber/silicon made fake fingers/hands, can be detected accurately. Thus, the security level of the contactless fingerprint reader can be boosted to a much higher level. This is also beneficial for authentication systems and applications that use the improved contactless fingerprint readers as input capture devices.

In an example, the step of calculating a value representing a texture pattern comprising steps of:
- defining a circle by a predetermined central pixel and a predetermined radius on the image captured with flash light;
- for each neighboring pixel on the circle, calculating a pixel difference between the neighboring pixel and the predetermined central pixel, comparing the pixel difference with a predetermined threshold to obtain a result 1, 0, or −1;
- calculating a sum of the results for all the neighboring pixels on the circle and multiplying the sum by two to the power of a total number of the neighboring pixels.

In the above example, the 3-valued (i.e., 1, 0, −1) texture presentation is advantageous as it overcomes limitations of traditional 2-valued texture presentation which is sensitive to noises. For example, with the traditional method, a minor grayscale change of the central pixel may generate different texture patterns, especially in smooth regions. By contrast, the 3-valued texture presentation is more robust to small noise. Therefore, the result value will more accurately reflect the real texture of the subject.

In an example, the step of extracting feature vectors of the one or more spatial-temporal signals comprises steps of:
for the one or more spatial-temporal signals:
- decomposing each signal by a discrete wavelet transform to calculate an energy of approximation coefficients and an energy of detailed coefficients;
- dividing a sub-band energy from the energies by a sum of the energies to calculate a relative energy of the signal as the feature vector of the signal.

Thus, by calculating the relative energy of the signal, the feature vector of the signal is obtained in a normalized way. This enables a multi-channel signal pattern analysis as the signals are generated from multiple sources/sensors.

In an example, there is a computer program comprising instructions which, when the program is executed by a processor of an anti-spoofing device, cause the device to carry out the steps of the method according to the invention.

In an example, there is an anti-spoofing device comprising:
 a memory;
 a processor which is adapted to perform the steps of a method according to according to the invention.

In an example, there is contactless fingerprint reader comprising:
 one or more light sources adapted to emit light under different lighting conditions;
 a first camera adapted to successively capture first images of a subject captured with and without flash light;
 at least one second camera adapted to capture second images from different angles;
 one or more sensors adapted to generate one or more spatial-temporal signals representing a change of a distance between the subject and one or more locations of the contactless fingerprint reader;
 communication module for sending the first images, the second images, and the one or more spatial-temporal signals to an anti-spoofing device.

In an example, the light sources are provided with films optimizing flash light reflection and enhancing texture patterns of said subject.

Thus, the films enable the light sources to provide special lighting conditions when the cameras capture the images of the subject. As a result, the reflections and enhanced textures on man-made materials will show unique patterns that are different from uniform patterns from the real hand/fingers, especially at some certain areas on the fake hand/fingers, the reflection of the flash light may not show any texture patterns rather than a flat bright area. More specifically, the enhanced texture pattern on man-made materials may show different intensities (grayscale levels) at different regions of the same finger or across different fingers. On the contrary, the enhanced texture pattern on real fingers may show the uniform intensities on all fingers.

Under the flash lighting through such kind of films, the appearance of the human skin is distinguishable from that of manmade materials that are commonly used to make fake hands/fingers, such like rubber, plastic, silicon, and so on. Thus, the use of the films on the light sources enable a more efficient texture analysis.

In an example, the sensors are Time-of-Flight are ToF sensors respectively provided on outer regions of a surface of the contactless fingerprint reader and surrounding the cameras arranged in inner regions of the surface.

Thus, the sensors generate multiple distance (between the subject to the reader) signals at different locations within an image capture area range. Thus, the generated distance signals can reflect a change of the distances between the subject and the reader (more exactly the respective sensor) from when the subject enters the image capture position until when the subject leaves the position.

The signals generated in this way provide rich information about the subject's motion patterns at different locations. This information is useful for a multi-channel signal pattern analysis to detect abnormal signal patterns.

In an example, the at least one second camera is a stereo camera having at least two lenses adapted to capture the second images respectively.

In an example, the at least one second camera are two cameras adapted to capture the second images respectively.

In an example, there is an anti-spoofing system comprising a contactless fingerprint reader according to the invention and an anti-spoofing device according to the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
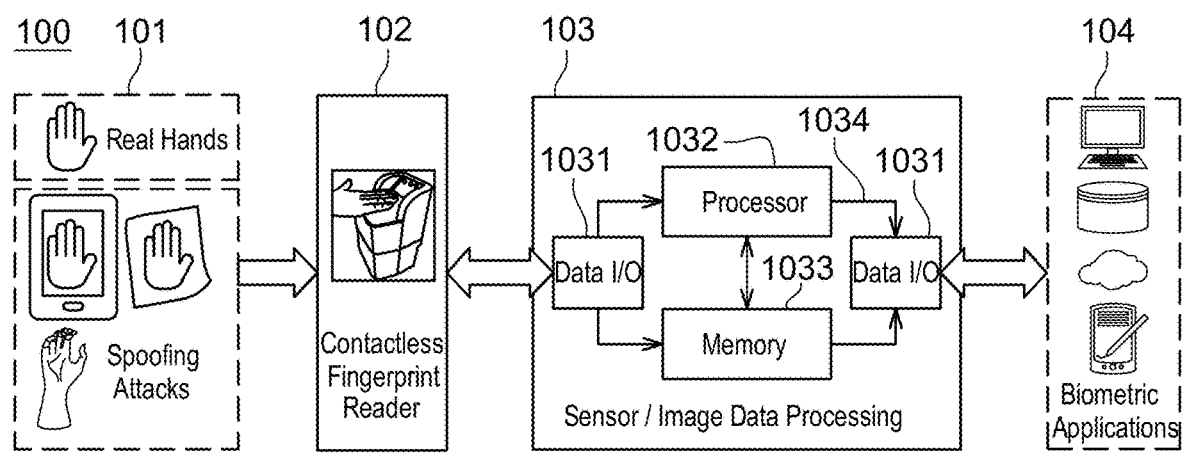
FIG. 1 represents a schematic diagram of an anti-spoofing system according to an example of the invention.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the principle of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

The invention can be implemented using a software system, a hardware system, or a combination thereof. FIG. 1 illustrates an exemplary architecture of a fingerprint based anti-spoofing system 100 wherein an anti-spoofing device 103 receives and analyzes images and sensor signals as input from a contactless fingerprint reader 102 to output an analysis result to be used by various applications, devices, systems, and platforms 104.

The contactless fingerprint reader 102 equipped with imaging and sensing hardware components (not shown in FIG. 1) is adapted to generate imaging and sensing data of a subject 101 entering a contactless image capture position in vicinity of the reader (e.g., in a position above the reader's image camera(s)). In other words, the reader 102 is able to generate the imaging and sensing data of the subject 101 without the subject contacting any surfaces or parts of the reader 102.

The generated imaging and sensing data is processed and analyzed by the device 103 which may be internally implemented in the reader 102 (e.g., device 103 may be the reader 102 itself), or implemented outside of the reader 102 in its vicinity or remotely (e.g., device 103 may be a standalone entity independent of the reader and able to receive data from the reader via a wired or wireless communication).

The system 100 may comprise different types of fingerprint based applications on various platforms 104 that may receive and utilize the data processed by the device 103.

It is also shown in FIG. 1 a schematic hardware structure of the device 103 which comprises: one or more data I/O ports 1031, data processing unit(s) 1032, memory(ies) 1033, and bus(es) 1034.

According to an example of the invention, data processing unit(s) 1032 comprises at least a controller, which includes but not limited to CPU, FPGA, DSP, or GPU. Data processing unit(s) 1032 process images of the subject and sensor data input from the reader 102's components to generate an output signal alerting a spoofing attack according to the invention's method.

The data I/O I/O port(s) 1031 includes but not limited to USB 2/3, FireWire, Thunderbolt, SATA, DMA, Ethernet, or Internet. These ports take the input images and/or sensor data from imaging and/or sensors of the contactless fingerprint reader 102, and send the output signal to the reader or other devices, systems, platforms 104.

The memory 1303 includes but is not limited to RAM, ROM, SSD, Hard drive, or NAS. The memory 1303 stores any intermediate results and the final output. The memory 1303 may further include computer programs to cause the data processing units 1032 to perform methods described herein.

Basically, when a subject 101 of a user such as a real hand, palm, fingers, or a subject held by a user such as a piece of paper, a displaying device, a fake hand, is presented to the contactless fingerprint reader 102, the reader 102 captures several types of images of the subject under different settings (e.g., with or without flash light), and collects sensor data (e.g., Time-of-Flight ToF measurements) of the subject, no matter if the subject is real or fake.

In an example, the captured imaging and sensing data is transferred from the contactless fingerprint reader 102 to the device 103 through a telecommunications network or cables (if device 103 is independent of the reader 102). Alternatively, the captured imaging and sensing data is processed within the contactless fingerprint reader 102 (if device 103 is within or the same as reader 102).

After receiving the imaging and sensing data, the processor 1032 analyzes data properties with image processing and machine learning methods and stores processed data/results in the memory 1033.

When the processing is done, the processor 1032 either returns an alert signal to the system if the processed result shows a spoofing attack, or sends the captured fingerprint images to different types of applications/devices/systems/platforms 104 that use the fingerprints as inputs for other objectives (e.g., identity authentication) if the processed result shows no spoofing attack (i.e., it is determined that the subject presented to the reader is a real hand/palm/fingers).

Figure 2:
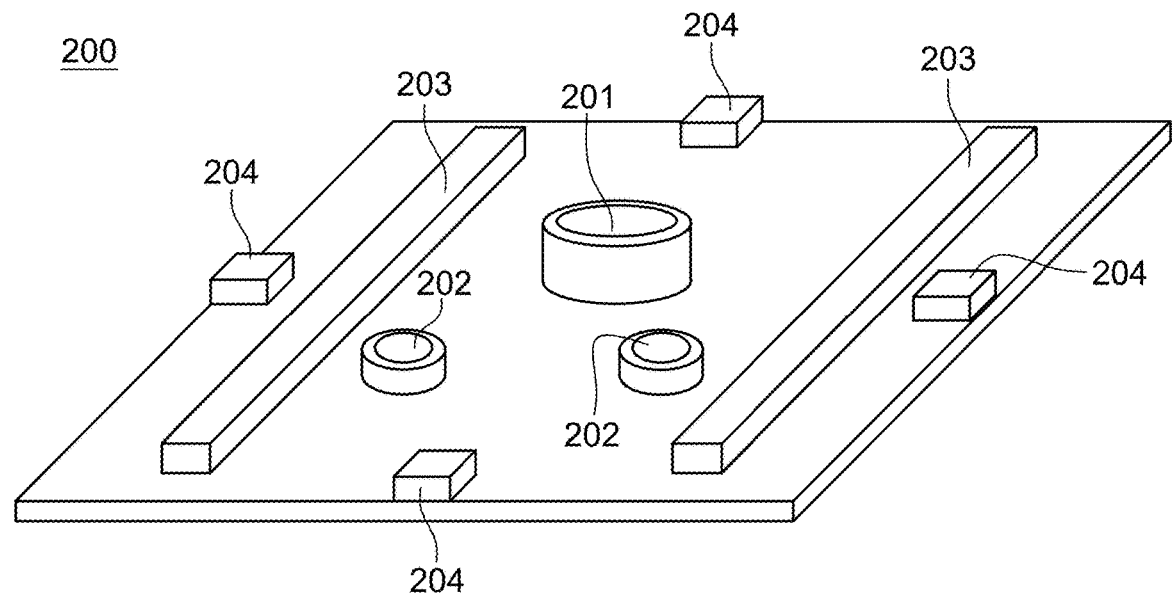
FIG. 2 illustrates a schematic design of a contactless fingerprint reader according to an example of the invention.

FIG. 2 illustrates a schematic diagram of a hardware structure of a contactless fingerprint reader 200 (e.g., reader 102 of FIG. 1) in an example of the invention. As shown in the figure, the contactless fingerprint reader 200 is equipped with components 201, 202, 203, 204 that collect imaging and sensing data that is related to the appearance and patterns of a subject presented to the reader.

For the sake of exemplifying but not limiting, the components of the reader may include a first camera 201 (or main camera, e.g.) which captures front view images of the subject, second cameras 202 (e.g.,) which captures stereo view images (e.g., a left view image and a right view image) of the subject, light sources 203 (e.g., light source which uses LED light strips in a tube as flash light) which provide different lighting settings like flashed light and non-flashed light, and ToF sensors 204 which collect subject-to-sensor distance signals at different positions.

In this example, the second cameras 202 are arranged so that when a hand is presented in an image capture position, the second cameras 202 are more near the fingers of the hand compared with the first camera 201. This optional feature enables a better capture of stereo images of fingers.

Optionally, the light bars 203 may be provided (e.g., coated) with special films (not shown) that provide special lighting conditions when the cameras capture the images of the subject. For example, the films may be bi-directional redirecting cone films. In these films, bright spots may be observed at the tips of the cones showing full replication.

In this example, the ToF sensors 204 may be arranged on outer regions of a surface of the contactless fingerprint reader 200 and surrounding the cameras 201, 202 arranged in inner regions of the surface. This optional feature advantageously enables the ToF sensor to generate the distance signals of the subject at different locations within an image capture area range.

Thus, the generated distance signals can reflect a change of the distances between the subject and the reader (more exactly the respective sensor) from when the subject enters the image capture position until when the subject leaves the position.

In the shown example, four ToF sensors 204 are respectively provided at centers of outer edges of the surface. Such an arrangement provides the signals captured from four symmetric locations as soon as the subject (e.g., hand) approaches the reader without any bias no matter how a user places the subject (e.g., her/his hand) over the reader. Other numbers and arrangements of ToF sensors may be used.

The surface may be one of an electronics compartment of the contactless fingerprint reader 200.

Two light bars 203 may be arranged in parallel on the surface too. The main camera 201 may be arranged substantially in the middle of the two light bars. Thus, the symmetric light bars from two directions provide a uniform lighting condition on the subject which is a 3D object. Alternative number and arrangements for the light sources 203 may be used.

In this example, the second cameras 202 may be adapted to respectively capture a left view image and a right view image of the subject (substantially) at the same time. The left view image and right view image are considered to make up a stereo view image of the subject.

Alternatively, the second camera is a stereo camera having at least two lenses adapted to respectively capture the left view and right view images.

The captured images and the sensor signals are related to information on a shape, a texture, and a motion of the subject presented to the reader, so that the device 103 (which may be the reader 102, 200 itself or a different independent device) is able to detect spoofing attacks by analyzing them.

In this example, the reader 200 may only generate the images and sensor signals to be transmitted to and processed by another independent device (e.g., device 103 of FIG. 1) to analyze if spoofing attacks exist.

The reader 200 comprises data I/O ports (not shown) including but not limited to USB 2/3, FireWire, Thunderbolt, SATA, DMA, Ethernet, or Internet. These ports may send the images and/or sensor data to the anti-spoofing device, and may receive an alert signal from the anti-spoofing device.

Alternatively, the reader 200 may also comprises a processor and a memory (not shown) to perform the anti-spoofing analyzing processes of the invention (to be discussed in details hereinafter).

Figure 3:
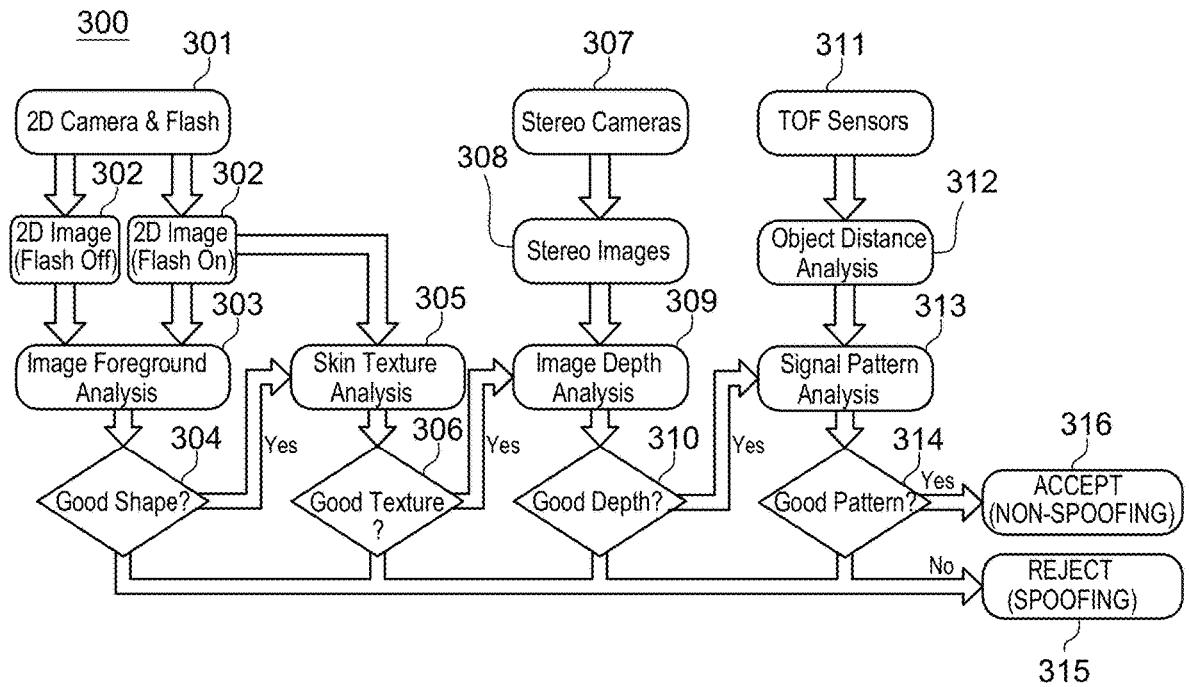
FIG. 3 shows a flowchart illustrating an anti-spoofing method for a contactless fingerprint reader according to an example of the invention.

FIG. 3 shows an overall workflow of a process 300 for data collection and anti-spoofing analysis for a contactless fingerprint reader.

When the subject is presented to the contactless fingerprint reader in a contactless capture area (e.g., above the reader's electronics compartment containing the cameras), two front view images (e.g., images which are normally supposed to present friction ridges if there is no spoofing attack) of the subject are captured 301, successively (or continuously) by the main camera of the reader. One image is captured 302 with flash light on, the other image is captured 302 with the flash light off.

The two front view images under the different lighting conditions for the same subject, the anti-spoofing process proceeds to 303 analysis of the shape (foreground shape analysis) of presented subject.

When it is detected 304 that the subject is not a hand/finger shaped subject, a spoofing attack like presenting printed hand/fingers is alerted 315.

If the subject's shape is determined as good, the front view image with the flash light on goes to a next step 305 of texture analysis.

In this example, the light sources of the reader are coated with special reflection films, under the flash lighting through such kind of films, the appearance of human skin is easily distinguishable from that of manmade materials that are commonly used to fabricate fake hands/fingers, such like rubber, plastic, silicon, and so on. This is an advantageous optional feature of the light sources.

After the texture analysis step 305, non-skin texture subject is identified 306 and reported 315 as spoofing attacks.

If the subject's texture is good, the process will proceed to check 309 a 3D shape, e.g., depth information, of the subject.

In this example, a stereo view image (depth map) of the subject is captured 307 by a dual-lens stereo camera of the reader. The depth map is made up by a left view image and a right view image captured 308 by the reader's two lenses.

The depth map provides depth information of the subject, so that the process is able to determine 310 whether the subject has a regular 3D shape of hand/fingers, and report 315 an error if any irregular 3D shapes are detected.

If the 3D shape of the subject is good, the process may proceed to analyze 313 ToF signals.

As an optional feature mentioned above, the ToF sensors may be installed on the reader at different positions within the image capture range, so that they can collect multiple subject-to-device distance signals at the different locations when the subject is approaching, suspending at, and leaving the contactless fingerprint reader's image capture position. Such kind of signals provide rich information about the subject motion patterns at the different locations.

The process is then able to detect 314 abnormal signal patterns from the multiple-channel signals based on machine learning and output 315 an alert signal.

It shall be noted that although the example on FIG. 3 shows that the different analysis steps 304, 305, 309, 313 are implemented in the specified order and based on a positive result of a preceding analysis step, they may be implemented in other orders or in parallel in other examples. Also, the performing of a next analysis does not have to rely on a positive result of a preceding analysis in another example.

Figure 4A:
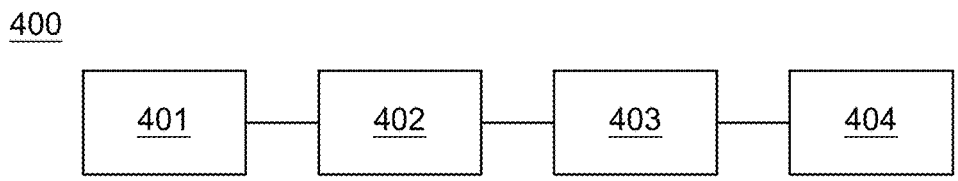
FIG. 4A illustrates a flowchart of a 2D shape analysis process according to an example of the invention.

FIG. 4A shows an exemplary process 400 explaining how a 2D shape of the subject presented to the reader is analyzed.

With the help of the light sources of the reader, two photos may be captured by the 2D camera (e.g., main camera) under different lighting conditions. One is with the flash light on, and the other is with the flash light off.

Optionally, the two images are captured continuously with an interval less than 10 ms. So that it can be assumed that there is no movement of the subject between the two images.

A processing device (e.g., device 103) receives 401 the two images from the contactless fingerprint reader.

A difference between the two images would be a portion that can be lighted up (illuminated) by the flash light. Since the background scene in the images is normally beyond the scope of the flash light, the lighted up portion of the images will only include the presented subject.

To this end, the processing device computes 402 pixel differences between the image captured with flash light and the image captured without flash light to estimate a foreground area in these images as a shape (contour) of the subject.

For example, by comparing the flash-on and flash-off images, a foreground of the images, i.e., the shape of the presented subject, can be computed by computing a pixel difference $I_D$ of the images according to the following equation:

$$I_D(x,y)=|I_f(x,y)-I_{nf}(x,y)|$$

where $I_f(x,y)$ is a pixel value of the flashed image at a position (x,y), and $I_{nf}(x,y)$ is a pixel value of the non-flashed image at the same position, and $I_D(x,y)$ is an absolute difference between the pixel (x,y) of the two images.

The same computations may be performed for all pixels of the two images to estimate the shape (contour) of the subject. In other words, the shape of the subject can be presented by $I_D(x,y)$ for all x and y of the pixels (x,y).

The processing device extracts 403 a feature vector of the shape to classify it into a positive class or a negative class based on machine learning.

After the foreground shape is estimated, it can be represented by HU moments (cf. Hu, M. K. (1962). Visual pattern recognition by moment invariants. IRE transactions on information theory, 8(2), 179-187) that is calculated according to the following equations:

$h0 = \eta 20 + \eta 02$ $h1 = (\eta 20 - \eta 02)^2 + 4\eta 11^2$ $h2 = (\eta 30 - 3\eta 12)^2 + (3\eta 21 - \eta 03)^2$ $h3 = (\eta 30 + \eta 12)^2 + (\eta 21 + \eta 03)^2$ $h4 = (\eta 30 - 3\eta 12)(\eta 30 + \eta 12)[(\eta 30 + \eta 12)^2 - 3(\eta 21 + \eta 03)^2] + 3(\eta 21 - \eta 03)[3(\eta 30 + \eta 12)^2 - (\eta 21 + \eta 03)^2]$ $h5 = (\eta 20 - \eta 02)[(\eta 30 + \eta 12)^2 - (\eta 21 + \eta 03)^2] + 4\eta 11(\eta 30 + \eta 12)(\eta 21 + \eta 03)]$ $h6 = (3\eta 21 - \eta 03)(\eta 30 + \eta 12)[(\eta 30 + \eta 12)^2 - 3(\eta 21 + \eta 03)^2] + (\eta 30 - \eta 12)(\eta 21 + \eta 03)[3(\eta 30 + \eta 12)^2 - (\eta 21 + \eta 03)^2]$ where nij are the normalized central moments of the estimated shape (contour) of the subject (i.e., the shape presented by $I_D(x,y)$). The HU moments are proven to be invariants to the image scale, rotation, and reflection.

After describing the shape with the HU moments (i.e., the extracted feature vector of the shape), the processing device may classify 404 the detected subject's shape into two different classes. For example, one is hand shaped subjects as a positive class, and the other is non-hand shaped subjects as a negative class.

Various well known classifiers like SVM, random forest, etc. may be trained with positive samples (HU moments of real hand/fingers photos) and negative samples (HU moments of fake hand/fingers photos) using traditional training methods. Such trained classifiers may be used for the 2D shape classification.

By using this 2D shape analysis process, a printed or on-screen displayed hand/fingers can be classified as non-hand shaped objects, i.e., spoofing attacks, and then detected and alerted quickly and accurately.

Figure 4B:
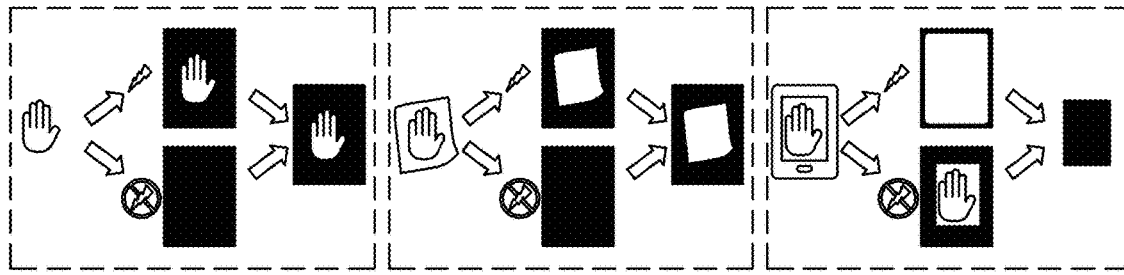
FIG. 4B illustrates an example of recognizing different subjects' 2D shapes.

FIG. 4B illustrates an example of recognizing different subjects' 2D shapes. On the left is shown a real hand's 2D shape. In the middle is shown an on-paper printed hand's 2D shape. On the right is shown an on-screen displayed hand's 2D shape.

Figure 5A:
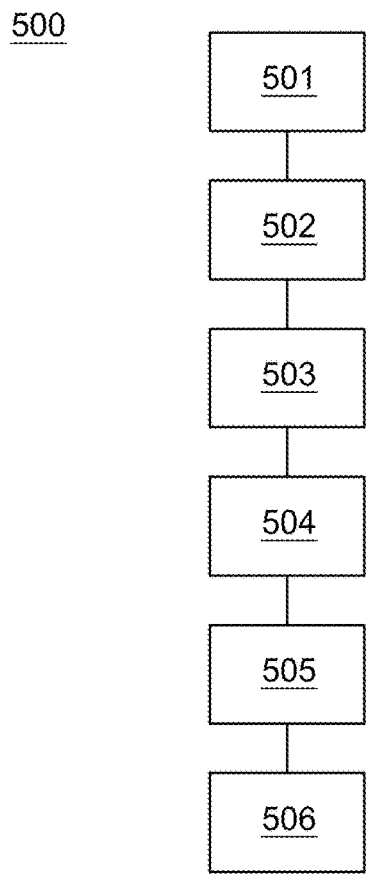
FIG. 5A illustrates a flowchart of a texture pattern analysis process according to an example of the invention.

FIG. 5A illustrates an exemplary flowchart of a texture analysis process 500.

The processing device may calculate 501 a value representing a texture pattern of an image of the subject captured with flash light and received from the contactless fingerprint reader. This image may be the image used in the 2D shape analysis, or another image captured with flash light by the reader.

The texture pattern value may be calculated by using various known methods. For example, LBP (Local binary patterns), HOG (Histogram of Oriented Gradients), GLCM (Gray-Level Co-Occurrence Matrix), etc.

In this example, the processing device may define 502, for the image, a circle with a predetermined central pixel (e.g., a center of the estimated shape) and a predetermined radius R (e.g., an empirical value) on the image captured with flash light.

The texture pattern value TPV can be calculated 503 according to the following equation:

$$TPV_{P,R} = \sum_{p=0}^{P-1} s(g_p - g_c) * 2^P$$

where $g_c$ is a pixel (grayscale) value of the central pixel, $g_p$ denotes a pixel (grayscale) value of the neighboring pixels on the circle of radius R, and P represents the total number of neighboring pixels.

$s(g_p - g_c)$ can be calculated according to the following equation:

$$s(x) = \begin{cases} 1 & x \geq t \\ 0 & |x| < t \\ -1 & x \leq -t \end{cases}$$

where t is a positive experiential threshold that is predetermined experimentally.

In other words, for each neighboring pixel on the circle, the process device calculates 503 a pixel difference $g_p - g_c$ between the neighboring pixel and the predetermined central pixel, and compares 504 the pixel difference $g_p - g_c$ with a predetermined threshold t to obtain a result which is one of the 3 values of 1, 0, and −1.

The process device then calculates 505 a sum $$\sum_{p=0}^{P-1} s(g_p - g_c)$$

of the results for all the neighboring pixels on the circle and multiplying the sum by two to the power of a total number of the neighboring pixels $2^P$.

Thus, this example employs a 3-valued texture presentation which is advantageously more accurate to extract the texture pattern feature and more robust to small noises.

In this example, the processing device then employs a random forest classifier to classify 506 the extracted TPVs into positive and negative classes, e.g., true and fake hand/fingers presented to the reader. Alternatively, other classifiers may be used for the texture classification, for example, SVM, Decision Tree, Logistic Regression, Deep Neural Networks, etc.

These classifiers may be trained with positive samples (e.g., texture pattern values of real hand/fingers skin) and negative samples (e.g., texture pattern values of manmade materials like rubber, plastic, silicon, etc.) using traditional training methods. Such trained classifiers may be used for the texture pattern classification.

As a result, even though man-made materials can build fake hand/fingers with similar shape and visual appearance as the real ones, the method of the invention may still allow distinguishing the real and fake hand/fingers by analyzing the textures of them.

In some cases, a hand shaped printed hand/fingers is(are) presented to the reader, which can by mis-classified by the 2D shape classification. So, in addition to the 2D shape analysis, the invention also proposes to capture stereo images of the subject and calculate a 3D shape of presented subject.

Figure 5B:
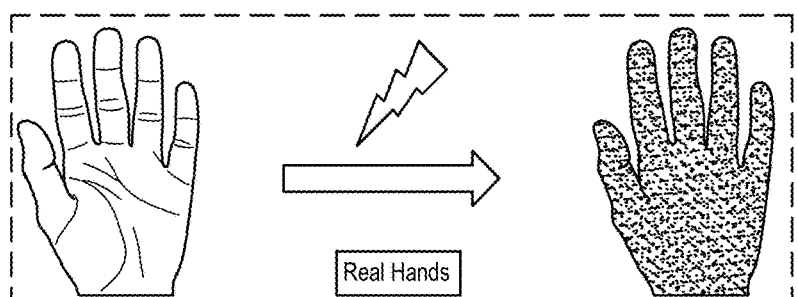
FIG. 5B illustrates a schematic diagram of a texture difference between a real hand/fingers and a fake hand/fingers under flash light according to an example of the invention.
Figure 5B:
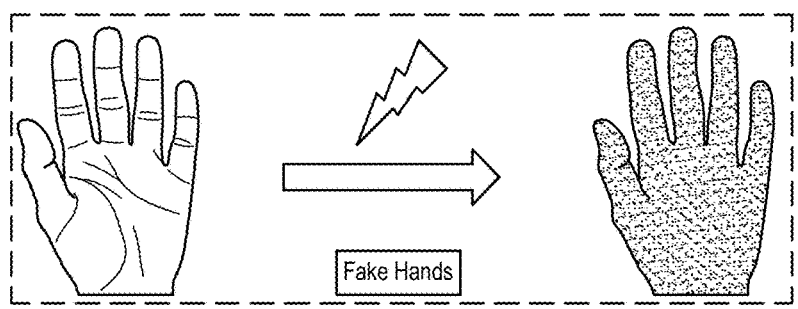

FIG. 5B illustrates an exemplary texture difference between a real hand/fingers and a fake one(s) under flash light.

Figure 6A:
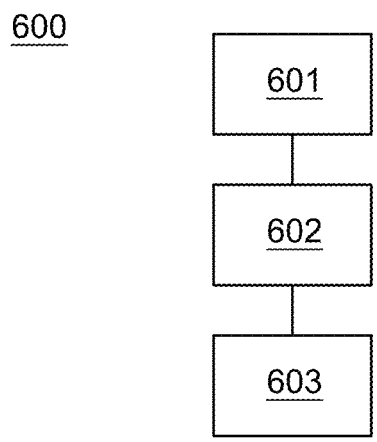
FIG. 6A illustrates a flowchart of a 3D shape (e.g., depth map) analysis process according to an example of the invention.

FIG. 6A shows a flowchart illustrating a process 600 of analyzing a 3D shape (e.g., depth map) according to an example of the invention.

We suppose in an example that, the contactless fingerprint reader has a stereo camera having two lenses installed and calibrated therein.

When the subject is presented to the reader, two images are taken, one by each lens, from different angles, for example, a left view image from a left lens and a right view image from a right lens.

The processing device receives 601 from the contactless fingerprint reader these images of the subject.

A 3D shape, or a depth map, of the presented subject can be calculated 602 by estimating a pixel disparity d of the two images according to the following equation:

$$d = \frac{f * T}{x_l - x_r}$$

where D is the disparity or depth of the pixel, f is a focal length of the lens (same f for the two lenses), T is a baseline of the stereo camera (i.e., a straight line distance between the two lenses), and $x_l - x_r$ represents a disparity of a certain point in the two images respectively from the left lens and right lens.

Same calculations are done for all pixels of the images to establish the depth map D of the subject, where $D(i,j) = d_{i,j}$, where $(i,j)$ is the coordinate of each pixel As a key difference between a real hand/fingers and a printed hand shaped ones is that the real hand/fingers are 3D subjects rather than flat 2D subjects, the depth map of the subject may facilitate to detect spoofing attacks with the hand-shaped printed subjects accurately.

The processing device may classify 603 the established depth map into a positive class or a negative class by using machine learning classifiers.

Various well known classifiers like SVM, random forest, etc. may be trained with positive samples (e.g., depth maps of real hand/fingers) and negative samples (e.g., depth maps of printed/on-screen displayed hand/fingers) using traditional training methods. Such trained classifiers may be used for the 3D shape classification.

As aforementioned, there are also some certain types of spoofing attacks that use fake hand/fingers made by rubber, plastic, or silicon instead of the printed ones or the ones displayed on the screen.

The aforementioned 2D/3D shape-based analysis would fail in such kind of application scenarios because the faked hand/fingers have the same 2D/3D shape and the similar visual appearance.

Advantageously, the contactless fingerprint reader may be equipped with flash lights that are provided with special light redirecting films. This type of film is able to optimize the flash light reflection and enhance the texture patterns of the subject presented to the reader, e.g., fingerprints on human skins, or characteristics on artificial materials.

As a result, the reflections and enhanced textures on man-made materials are show unique patterns that are different from the uniform patterns from the real hand/fingers.

Especially at some certain areas on the fake hand/fingers, the reflection of the flash light may not show any texture patterns rather than a flat bright area.

Thus, the use of the films on the light sources of the reader may be beneficial and efficient for the texture analysis in order to detect a spoofing attack.

Figure 6B:
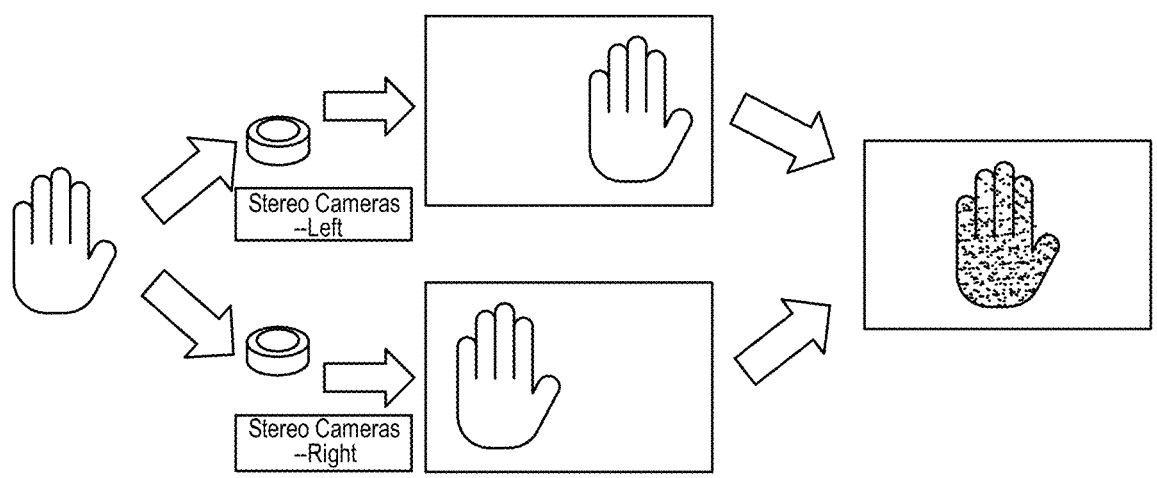
FIG. 6B illustrates an example of establishing a depth map of a hand.

FIG. 6B illustrates an example of establishing a depth map of a hand from two images of the hand captured from a left lens and a right lens of a stereo camera.

Figure 7A:
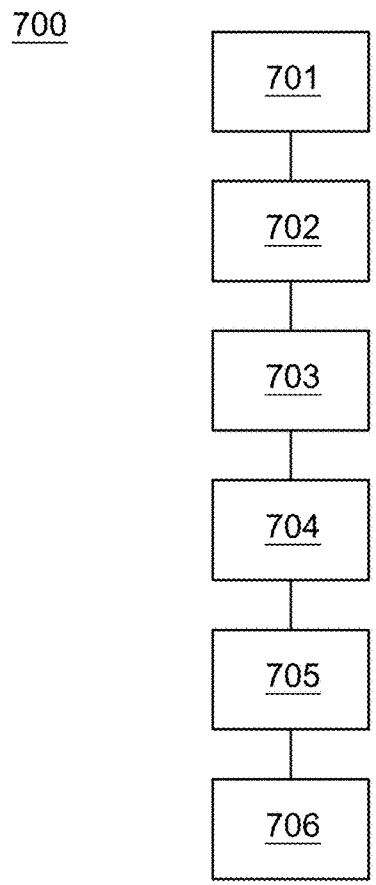
FIG. 7A illustrates a flowchart of a motion analysis process according to an example of the invention.

FIG. 7A illustrates an exemplary flowchart of a motion analysis process 700.

When the subject is being presented to the contactless fingerprint reader, the ToF sensors of the reader output spatial-temporal signals of the subject distance from different regions of the capture area.

Specifically, as users may present their hands to the reader and move their hands away in certain ways, the spatial-temporal signals from TOF sensors at different regions may reflect certain motion/distance patterns that can be treated as a criteria to distinguish the real hands from spoofing attacks generating different motion/distance patterns.

In this example, the processing device receives 701 from the contactless fingerprint reader the spatial-temporal signals representing a change of a distance between the subject and different locations of the contactless fingerprint reader during a predetermined time period (e.g., which starts when the reader is ready to capture, and stops when the capture is done).

The processing device extracts 702 feature vectors of the spatial-temporal signals.

The received ToF sensor signals are first decomposed 703 by Discrete Wavelet Transform DWT (cf. Shensa, M. J. (1992). The discrete wavelet transform: wedding the a trous and Mallat algorithms. IEEE Transactions on signal processing, 40(10), 2464-2482) into multiple levels of sub-band representations at different scales.

For a signal x(n) (e.g., one of the sensed spatial-temporal signals) with a time length of M, a wavelet approximation coefficient $A_i$ and a detailed coefficient $D_i$ at the ith level of the signal can be represented according to the following equation:

$$A_{j_0,k} = \frac{1}{\sqrt{M}} \sum_n x(n) * \phi_{j_0,k}(n)$$

$$D_{j,k} = \frac{1}{\sqrt{M}} \sum_n x(n) * \psi_{j,k}(n)$$

where $\phi_{j_0,k}(n)$ is a scaling function that represents an impulse response of low pass filter, $\psi_{j,k}(n)$ is a wavelet function that represents an impulse response of high pass filter, and n=1, . . . , M−1.

Assuming that the signal x(n) is decomposed into J levels, normally it is built that $M = 2^J$, and let $j_0 = J$, j=0, 1, . . . , J−1, and k=0, 1, . . . , $2^{j-1}$, an energy of the approximation coefficient $E_A$ and an energy of the detailed coefficient $E_D$ can be computed 704 according to the following equation:

$$E_D = \sum_{k=1}^{N} |D_{j,k}|^2, \quad j = 1, 2, \ldots, J$$

$$E_A = \sum_{k=1}^{N} |A_{j_0,k}|^2, \quad j_0 = J$$

Based on the computed energies $E_D$ and $E_A$, a relative energy $E_R$ may be calculated 705 as a feature vector of the signal x(n) according to the following equation:

$$E_R = \frac{E_x}{E_{Total}}$$

where $E_x$ represents any sub-band energy from $E_D$ and $E_A$ (i.e., $E_x$ represents any $E_D$ or $E_A$), and $E_{Total}=E_A+E_D$.

After the feature vector for each of the spatial-temporal signals is calculated, the feature vectors $E_R$ will be sent to a classifier for further classification.

In this example, the processing device may use Support Vector Machines (SVMs) as a classifier to distinguish 706 the signals from real hand/fingers subjects and the subjects from spoofing attacks.

Alternatively, other classifiers may be used for the motion/distance classification, for example, SVM, Decision Tree, Logistic Regression, Deep Neural Networks, etc.

These classifiers may be trained with positive samples (e.g., relative energies of spatial-temporal signals from real hand/fingers) and negative samples (e.g., relative energies of spatial-temporal signals from fake hand/fingers) using traditional training methods. Such trained classifiers may be used for the motion/distance classification.

As aforementioned, the processing device detects (e.g., 315 of FIG. 3) a spoofing attack if there is at least one negative classification result from the above mentioned classifying steps, for example, the 2D shape classification, texture pattern classification, 3D shape classification, motion/distance classification.

The processing device may output an alert informing of the spoofing attack upon detecting a negative classification result.

Figure 7B:
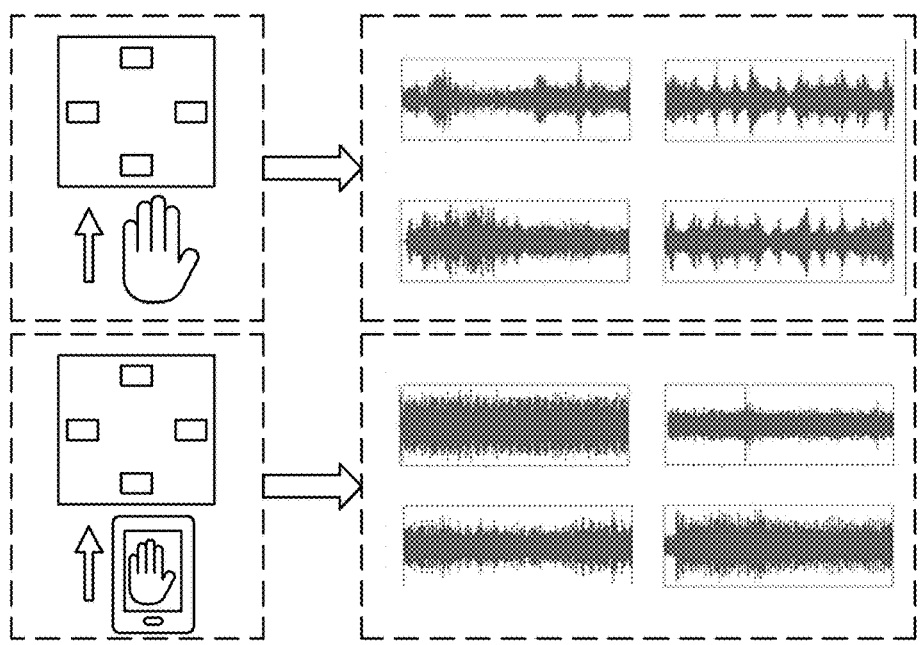
FIG. 7B illustrates a schematic diagram of spatial-temporal signals generated by sensors detecting from a real hand/fingers and from a fake hand/fingers according to an example of the invention.

FIG. 7B illustrates a schematic diagram of spatial-temporal signals generated by four sensors arranged respectively on centers of edges of a surface of a contactless fingerprint reader. Above is shown spatial-temporal signals of a real hand/fingers presented to the reader. Below is shown spatial-temporal signals of an on-screen displayed hand presented to the reader.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. An anti-spoofing method for a contactless fingerprint reader, the method comprising steps of:
receiving, from said contactless fingerprint reader, first images of a subject successively captured with and without flash light;
computing pixel differences between the image captured with flash light and the image captured without flash light to estimate a foreground area in these images as a shape of said subject;
extracting a feature vector of said shape to classify it into a positive class or a negative class based on machine learning;
calculating a value representing a texture pattern of an image of said subject captured with flash light and received from said contactless fingerprint reader to classify said value into a positive class or a negative class based on machine learning;
receiving, from said contactless fingerprint reader, second images of said subject captured from different angles;
computing from said second images a depth map of said subject to classify said depth map into a positive class or a negative class based on machine learning;
receiving, from said contactless fingerprint reader, one or more spatial-temporal signals representing a change of a distance between said subject and one or more locations of said contactless fingerprint reader;
extracting feature vectors of said one or more spatial-temporal signals to classify said feature vectors into a positive class or a negative class based on machine learning by:
decomposing each signal by a discrete wavelet transform to calculate an energy of approximation coefficients and an energy of detailed coefficients; and
dividing a sub-band energy from said energies by a sum of said energies to calculate a relative energy of the signal as said feature vector of the signal; and
detecting a spoofing attack if there is at least one negative classification result from the above classifying steps.

2. The method according to claim 1, said step of calculating a value representing a texture pattern comprising steps of:
defining a circle by a predetermined central pixel and a predetermined radius on said image captured with flash light;
for each neighboring pixel on said circle, calculating a pixel difference between said neighboring pixel and said predetermined central pixel, comparing said pixel difference with a predetermined threshold to obtain a result 1, 0, or −1;
calculating a sum of said results for all the neighboring pixels on said circle and multiplying said sum by two to the power of a total number of the neighboring pixels.

3. A non-transient computer memory comprising:
a computer program with instructions which, when the program is executed by a processor of an anti-spoofing device, cause the device to carry out a method having the steps:
receiving, from said contactless fingerprint reader, first images of a subject successively captured with and without flash light;
computing pixel differences between the image captured with flash light and the image captured without flash light to estimate a foreground area in these images as a shape of said subject;
extracting a feature vector of said shape to classify it into a positive class or a negative class based on machine learning;
calculating a value representing a texture pattern of an image of said subject captured with flash light and received from said contactless fingerprint reader to classify said value into a positive class or a negative class based on machine learning;
receiving, from said contactless fingerprint reader, second images of said subject captured from different angles;
computing from said second images a depth map of said subject to classify said depth map into a positive class or a negative class based on machine learning;

receiving, from said contactless fingerprint reader, one or more spatial-temporal signals representing a change of a distance between said subject and one or more locations of said contactless fingerprint reader;

extracting feature vectors of said one or more spatial-temporal signals to classify said feature vectors into a positive class or a negative class based on machine learning by:

decomposing each signal by a discrete wavelet transform to calculate an energy of approximation coefficients and an energy of detailed coefficients; and dividing a sub-band energy from said energies by a sum of said energies to calculate a relative energy of the signal as said feature vector of the signal; and detecting a spoofing attack if there is at least one negative classification result from the above classifying steps.

4. The non-transient computer memory of claim 3, wherein wherein the instructions for causing the processor to perform the step of calculating a value representing a texture pattern comprises instructions to cause the processor to perform the steps:

defining a circle by a predetermined central pixel and a predetermined radius on said image captured with flash light;

for each neighboring pixel on said circle, calculating a pixel difference between said neighboring pixel and said predetermined central pixel, comparing said pixel difference with a predetermined threshold to obtain a result 1, 0, or −1;

calculating a sum of said results for all the neighboring pixels on said circle and multiplying said sum by two to the power of a total number of the neighboring pixels.

5. An anti-spoofing device comprising:

a memory;

a processor which is adapted to:

receive, from a contactless fingerprint reader, first images of a subject successively captured with and without flash light;

compute pixel differences between the image captured with flash light and the image captured without flash light to estimate a foreground area in these images as a shape of said subject;

extract a feature vector of said shape to classify it into a positive class or a negative class based on machine learning;

calculate a value representing a texture pattern of an image of said subject captured with flash light and received from said contactless fingerprint reader to classify said value into a positive class or a negative class based on machine learning;

receive, from said contactless fingerprint reader, second images of said subject captured from different angles;

compute from said second images a depth map of said subject to classify said depth map into a positive class or a negative class based on machine learning;

receive, from said contactless fingerprint reader, one or more spatial-temporal signals representing a change of a distance between said subject and one or more locations of said contactless fingerprint reader;

extract feature vectors of said one or more spatial-temporal signals to classify said feature vectors into a positive class or a negative class based on machine learning by:

decomposing each signal by a discrete wavelet transform to calculate an energy of approximation coefficients and an energy of detailed coefficients; and dividing a sub-band energy from said energies by a sum of said energies to calculate a relative energy of the signal as said feature vector of the signal; and detect a spoofing attack if there is at least one negative classification result from the above classifying steps.

6. The anti-spoofing device of claim 5, wherein to calculate a value representing a texture pattern the anti-spoofing device is adapted to:

define a circle by a predetermined central pixel and a predetermined radius on said image captured with flash light;

for each neighboring pixel on said circle, calculate a pixel difference between said neighboring pixel and said predetermined central pixel, comparing said pixel difference with a predetermined threshold to obtain a result 1, 0, or −1;

calculate a sum of said results for all the neighboring pixels on said circle and multiplying said sum by two to the power of a total number of the neighboring pixels.

7. An anti-spoofing system comprising:

a contactless fingerprint reader having:

one or more light sources adapted to emit light under different lighting conditions;

a first camera adapted to successively capture first images of a subject captured with and without flash light;

at least one second camera adapted to capture second images from different angles;

one or more sensors adapted to generate one or more spatial-temporal signals representing a change of a distance between said subject and one or more locations of said contactless fingerprint reader; and a communication module for sending said first images, said second images, and said one or more spatial-temporal signals to an anti-spoofing device; and an anti-spoofing device having:

a memory;

a processor which is adapted to:

receive, from a contactless fingerprint reader, first images of a subject successively captured with and without flash light;

compute pixel differences between the image captured with flash light and the image captured without flash light to estimate a foreground area in these images as a shape of said subject;

extract a feature vector of said shape to classify it into a positive class or a negative class based on machine learning;

calculate a value representing a texture pattern of an image of said subject captured with flash light and received from said contactless fingerprint reader to classify said value into a positive class or a negative class based on machine learning;

receive, from said contactless fingerprint reader, second images of said subject captured from different angles;

compute from said second images a depth map of said subject to classify said depth map into a positive class or a negative class based on machine learning;

receive, from said contactless fingerprint reader, one or more spatial-temporal signals representing a change of a distance between said subject and one or more locations of said contactless fingerprint reader;

extract feature vectors of said one or more spatial-temporal signals to classify said feature vectors into a positive class or a negative class based on machine learning by:

decomposing each signal by a discrete wavelet transform to calculate an energy of approximation coefficients and an energy of detailed coefficients; and dividing a sub-band energy from said energies by a sum of said energies to calculate a relative energy of the signal as said feature vector of the signal; and detect a spoofing attack if there is at least one negative classification result from the above classifying steps.

8. The anti-spoofing system according to claim 7, wherein said light sources are provided with films optimizing flash light reflection and enhancing texture patterns of human skin.

9. The anti-spoofing system according to claim 7, wherein said sensors are ToF sensors respectively provided on outer regions of a surface of the contactless fingerprint reader and surrounding the cameras arranged in inner regions of the surface.

10. The anti-spoofing system according to claim 7, wherein said at least one second camera is a stereo camera having at least two lenses adapted to capture said second images respectively.

11. The anti-spoofing system according to claim 7, wherein said at least one second camera are two cameras adapted to capture said second images respectively.

12. The anti-spoofing system of claim 7, wherein the processor is adapted to calculate the texture pattern by:

defining a circle by a predetermined central pixel and a predetermined radius on said image captured with flash light;

for each neighboring pixel on said circle, calculating a pixel difference between said neighboring pixel and said predetermined central pixel, comparing said pixel difference with a predetermined threshold to obtain a result 1, 0, or −1;

calculating a sum of said results for all the neighboring pixels on said circle and multiplying said sum by two to the power of a total number of the neighboring pixels.

* * * * *